Figure 1:
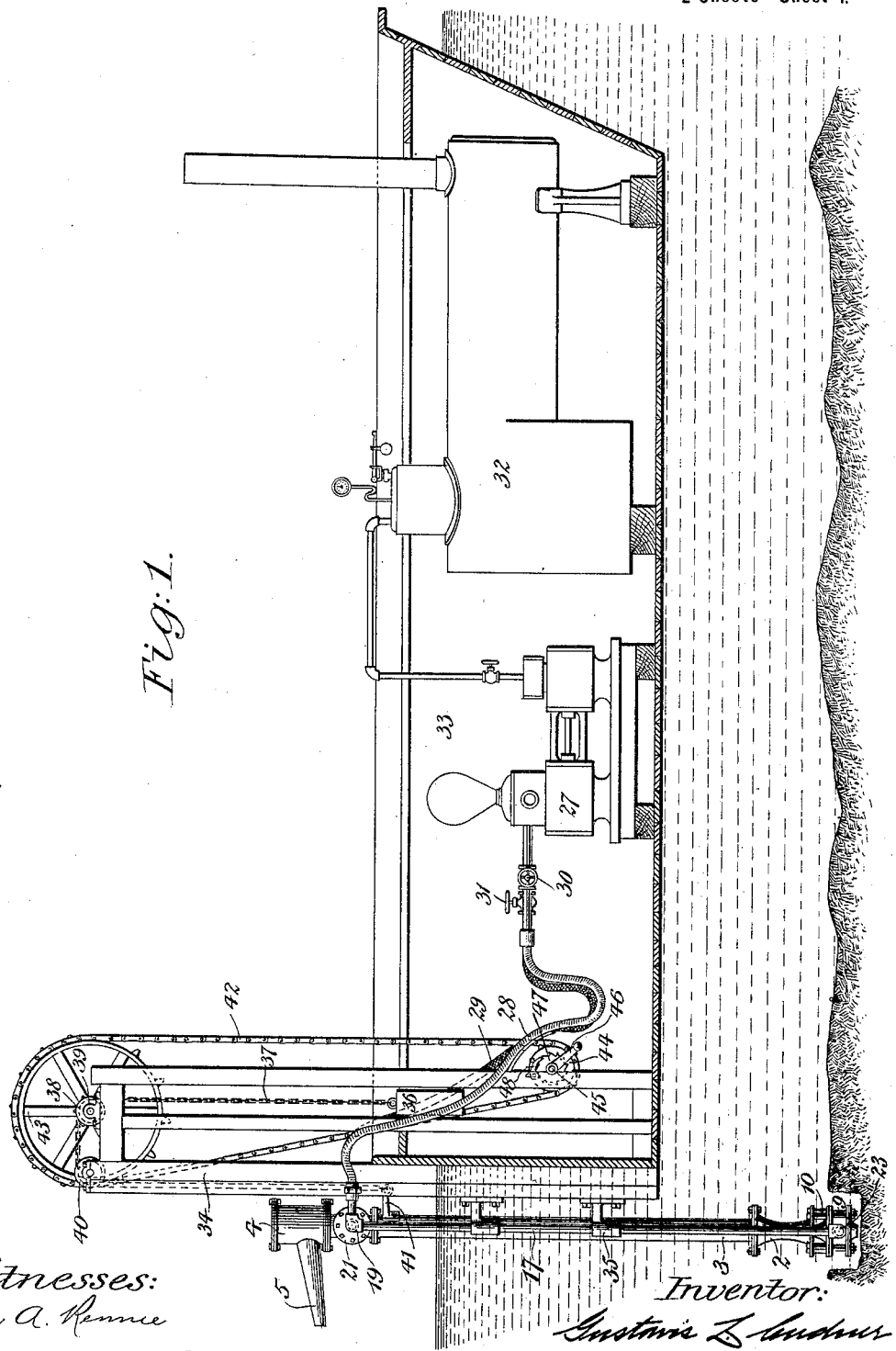

No. 697,704. Patented Apr. 15, 1902.
G. L. CUDNER.
HYDRAULIC DREDGER, EXCAVATOR, AND ELEVATOR.
(Application filed June 5, 1901.)
(No Model.) 2 Sheets—Sheet 1.

Witnesses:
John A. Rennie
George Barry Jr

Inventor:
Gustavus L. Cudner
by attorneys

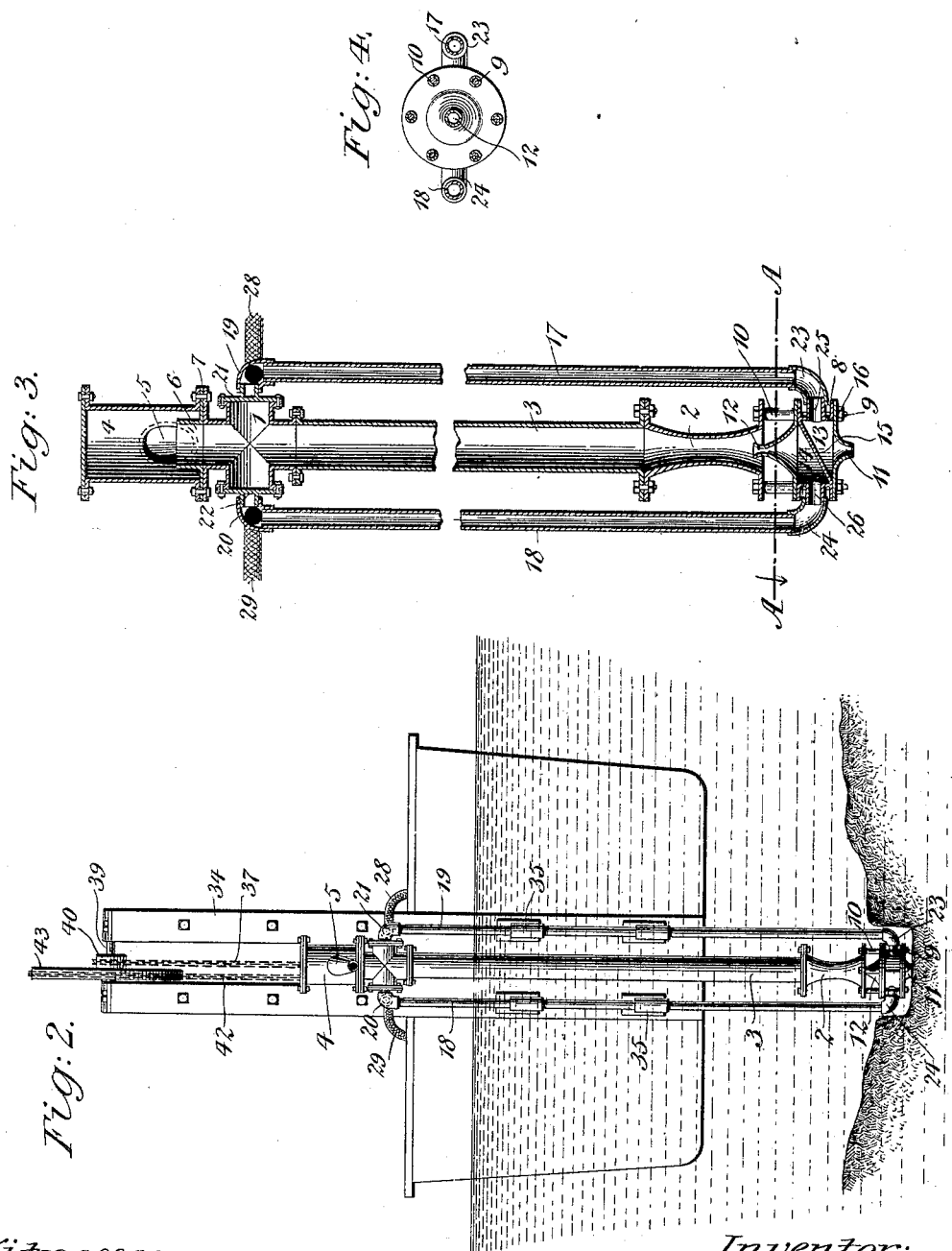

UNITED STATES PATENT OFFICE.

GUSTAVIS L. CUDNER, OF NEW YORK, N. Y.

HYDRAULIC DREDGER, EXCAVATOR, AND ELEVATOR.

SPECIFICATION forming part of Letters Patent No. 697,704, dated April 15, 1902.

Application filed June 5, 1901. Serial No. 63,202. (No model.)

*To all whom it may concern:*

Be it known that I, GUSTAVIS L. CUDNER, a citizen of the United States, and a resident of the borough of Manhattan, in the city and State of New York, have invented a new and useful Improvement in Hydraulic Dredgers, Excavators, and Elevators, of which the following is a specification.

My invention consists of an improvement in hydraulic dredgers, excavators, and elevators, and has for its object to provide an apparatus in which the material may be thoroughly disintegrated and then elevated in a very simple and effective manner.

A further object is to provide an apparatus of the above character which may be readily adjusted to different heights and which will be capable of elevating sand, mud, gravel, and other material to a high level.

A practical embodiment of my invention is represented in the accompanying drawings, in which—

Figure 1 represents my improved apparatus in connection with a boat or scow, the apparatus being shown in its working position. Fig. 2 is an end view of the same. Fig. 3 is an enlarged detail view of the portion of the apparatus which embodies the stand-pipe, the nozzle-chest, the hydraulic feed-pipes, and the discharge-box; and Fig. 4 is a horizontal section taken in the plane of the line A A of Fig. 3.

The stand-pipe of the apparatus comprises a head-section 1, an injector-section 2, and one or more intermediate sections 3. The stand-pipe is provided with an open bottom for the reception of the material to be elevated and an open top for discharging the material.

A closed discharge-box 4 is secured to the head-section 1 of the stand-pipe, which discharge-box is provided with a discharge-spout 5, which may convey the material to any desired point.

The top of the stand-pipe is preferably projected into the interior of the discharge-box 4, above the bottom thereof, by providing a supplemental tubular section 6, having a flange 7 interposed between the flanges of the discharge-box 4 and the head-section 1 of the stand-pipe.

A nozzle-chest 8 is spaced a short distance below the open bottom of the stand-pipe by means of an annular series of bolts 9, having sleeves 10 thereon interposed between the bottom of the stand-pipe and the top of the nozzle-chest. This nozzle-chest is provided with oppositely-directed nozzles 11 and 12, the nozzle 11 being directed downwardly away from the bottom of the stand-pipe and the nozzle 12 being directed along the column and preferably projecting a short distance into the open bottom of the stand-pipe, serving to form, together with the lower section of the stand-pipe, an injector for drawing the material from the exterior upwardly into the interior of the stand-pipe and forcing it upwardly therethrough into the discharge-box. This nozzle-chest is preferably divided into two nozzle-chambers 13 and 14 for the respective downwardly and upwardly extended nozzles 11 and 12 by means of an inclined partition 15, this partition preferably being formed integral with the sides of the nozzle-chest. The nozzles 11 and 12 preferably form the top and bottom of the said nozzle-chest, and the bolts 9 pass through exterior flanges on the said nozzles and sides of the nozzle-chest, whereby the several parts are secured together and at the same time spaced the required distance below the bottom of the stand-pipe by the nuts 16, which engage the free ends of the bolts 9.

Two hydraulic feed-pipes 17 18 are connected at their lower ends to the nozzle-chest, the feed-pipe 17 communicating with the interior of the chamber 13 for feeding the water under pressure to the nozzle 11 and the feed-pipe 18 communicating with the chamber 14 for feeding the water under pressure to the nozzle 12. These pipes are rigidly secured upon opposite sides of the stand-pipe by spacing their upper ends rigidly therefrom.

In the accompanying drawings I have shown double elbow-joints 19 and 20, rigidly connecting the upper ends of the feed-pipes 17 and 18 with studs 21 22, carried by the head-section 1 of the stand-pipe. I have also shown the lower ends of the said rigid feed-pipes 17 and 18 as connected to the nozzle-chest by means of elbow-joints 23 24, which couple the said lower ends to hollow studs 25 26, projecting from the sides of the nozzle-chest and opening, respectively, into the nozzle-chambers 13 and 14.

The hydraulic feed-pipes 17 and 18 are connected with a suitable hydraulic pump 27 through flexible hose-pipes 28 29, which communicate with the said pipes 17 and 18 at the double elbow-joints 19 and 20.

Cocks 30 31 may be provided for regulating the flow of the water from the hydraulic pump 27. A suitable boiler 32 is employed for furnishing power to operate the hydraulic pump.

The scow, which is represented as carrying the apparatus hereinabove described, is denoted by 33, and it may be of any well-known and approved construction.

The stand-pipe and its connected parts are located exterior to the scow 33 and may be adjusted frequently for bringing its lower end into the proper position for dredging and excavating.

The means which I have shown for adjustably mounting the stand-pipe and its connected parts is constructed and arranged as follows: A suitable framework 34 is mounted at one end of the scow, which framework is provided with a plurality of guide-brackets 35, which embrace the hydraulic feed-pipes 17 and 18 upon opposite sides of the stand-pipe. These brackets are preferably arranged in pairs, as shown, so as to obtain an extended bearing for the said feed-pipes, and the brackets are so arranged that they will permit the stand-pipe and its connected parts to have a considerable range of vertical adjustment to render the apparatus applicable for use on bottoms at various distances from the surface of the water. A counterbalance-weight 36 is provided with a chain 37, which passes upwardly and over a sprocket-wheel 38, fixed to a shaft 39, mounted in the top of the framework 34, and from thence passes over an idler-pulley 40 and downward, where its other end is connected to a rearwardly-extended bracket 41, carried by the stand-pipe.

For permitting the apparatus to be easily raised and lowered I provide a sprocket-chain 42, which passes over a large sprocket 43, fixed to the shaft 39, and around a small sprocket-wheel 44, fixed to a shaft 45, mounted on the apparatus-supporting frame 34. This shaft 45 is provided with an operating crank-handle 46 and is also provided with a ratchet 47, engaged by a pawl 48 for holding the apparatus in any of its vertical adjustments.

The operation of my improved apparatus is as follows: The apparatus is lowered until its lower end is brought into close proximity to the material which it is intended to remove. The water is then forced through the nozzles 11 and 12 under the required pressure to produce the following results: The nozzle 11 will direct the jet of water with great force against the material, thus thoroughly stirring it up. The jet of water issuing from the injector-nozzle 12 will suck the agitated material upwardly through the open bottom of the stand-pipe and will force the material upwardly along the same into the discharge-box 4, from whence it may be conveyed by the spout 5 to any desired point.

The flexible hose-pipes 28 29 are made of sufficient length to permit the apparatus to be raised and lowered to the limits of its movement without interfering with the connection between the hydraulic pump and the apparatus.

Certain portions of the structure which relate more particularly to the construction of the stand-pipe and its adjusting mechanism are not claimed herein, but form the subject-matter of a divisional application filed by me the 30th day of August, 1901, the serial number being 73,802.

It is evident that changes might be resorted to in the construction, form, and arrangement of the several parts without departing from the spirit and scope of my invention. Hence I do not wish to limit myself strictly to the structure herein set forth; but

What I claim is—

1. A dredger, excavator and elevator comprising a stand-pipe having an inlet and outlet for the material and a nozzle-chest secured to the stand-pipe and spaced from the inlet, the said nozzle-chest having opposite projected nozzles arranged to direct jets into the material and into the stand-pipe for disintegrating the material, drawing it into the stand-pipe and elevating it, substantially as set forth.

2. A dredger, excavator and elevator comprising a stand-pipe having an inlet and an outlet, a nozzle-chest spaced from the inlet and having two chambers therein, a nozzle projected outwardly from one chamber for directing a jet into the material for disintegrating it and another nozzle projected inwardly from the other chamber for directing a jet into the stand-pipe for drawing in and elevating the disintegrated material, substantially as set forth.

3. A dredger, excavator and elevator comprising a stand-pipe having its bottom and top ends open to form an inlet and outlet respectively, a nozzle-chest spaced from the open inlet end of the pipe having an outwardly-projected nozzle and an inwardly-projected nozzle and hydraulic feed-pipes communicating with the nozzle-chest, substantially as set forth.

4. A dredger, excavator and elevator comprising a stand-pipe consisting of a head-section, an injector-section and one or more intermediate sections and a nozzle-chest spaced from the injector-section and having an inwardly-projected nozzle arranged to form an injector with the injector-section of the stand-pipe for drawing in and elevating the material, substantially as set forth.

5. A dredger, excavator and elevator comprising a stand-pipe having an inlet and an outlet for the material, a nozzle-chest, a diagonal partition dividing the nozzle-chest into two chambers, feed-pipes leading to the two chambers, a nozzle projected outwardly from one chamber and a nozzle projected inwardly from the other chamber, substantially as set forth.

6. A dredger, excavator and elevator comprising a stand-pipe having an open bottom, a nozzle-chest having oppositely-projected nozzles, means for securing the nozzle-chest to the bottom of the stand-pipe and spacing it therefrom comprising an annular series of bolts and sleeves located on the bolts and interposed between the chest and the bottom of the stand-pipe, substantially as set forth.

In testimony that I claim the foregoing as my invention I have signed my name, in presence of two witnesses, this 28th day of May, 1901.

GUSTAVIS L. CUDNER.

Witnesses:
  FREDK. HAYNES,
  C. S. SUNDGREN.